United States Patent
Chemali et al.

(10) Patent No.: US 6,850,068 B2
(45) Date of Patent: Feb. 1, 2005

(54) FORMATION RESISTIVITY MEASUREMENT SENSOR CONTAINED ONBOARD A DRILL BIT (RESISTIVITY IN BIT)

(75) Inventors: Roland E. Chemali, Kingwood, TX (US); Paul Pastusek, The Woodlands, TX (US); Friedhelm Makohl, Hermannsburg (DE); René N. Ritter, Celle (DE); Martin Townley Evans, Thorpe St. Andrew (GB); Stanley T. Hewitt, Slidell, LA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/462,884

(22) Filed: Jun. 16, 2003

(65) Prior Publication Data

US 2004/0104726 A1 Jun. 3, 2004

Related U.S. Application Data

(63) Continuation-in-part of application No. 10/090,374, filed on Mar. 4, 2002, now Pat. No. 6,600,321, which is a continuation-in-part of application No. 09/836,980, filed on Apr. 18, 2001, now Pat. No. 6,714,014.

(51) Int. Cl.$^7$ ................................................ G01V 3/20
(52) U.S. Cl. ........................................ 324/369; 175/50
(58) Field of Search ................................. 324/366–367, 324/347, 354–356; 175/50; 340/853.1, 853.2, 853.6

(56) References Cited

U.S. PATENT DOCUMENTS

| | | | |
|---|---|---|---|
| 3,973,181 A | | 8/1976 | Calvert |
| 4,468,623 A | | 8/1984 | Gianzero et al. |
| 5,448,227 A | | 9/1995 | Orban et al. |
| 5,501,285 A | * | 3/1996 | Lamine et al. ............... 175/27 |
| 5,813,480 A | * | 9/1998 | Zaleski, Jr. et al. .......... 175/40 |
| 6,057,784 A | | 5/2000 | Schaaf et al. |

* cited by examiner

Primary Examiner—Bot LeDynh
(74) Attorney, Agent, or Firm—Madan, Mossman & Sriram, P.C.

(57) ABSTRACT

A method and apparatus for obtaining a resistivity measurement of an earth formation surrounding a borehole in an MWD device uses an electrode for injecting current into the earth formation and an electrode for obtaining a responsive signal from the borehole. The electrodes are located on the drill bit arm or blade. Measured resistivity values are obtained at the location of the drill bit. Measurements can be taken in both oil-based mud and water-based mud environments. Maximum or minimum resistivity can be used to best represent the resistivity of the surrounding formation.

12 Claims, 6 Drawing Sheets

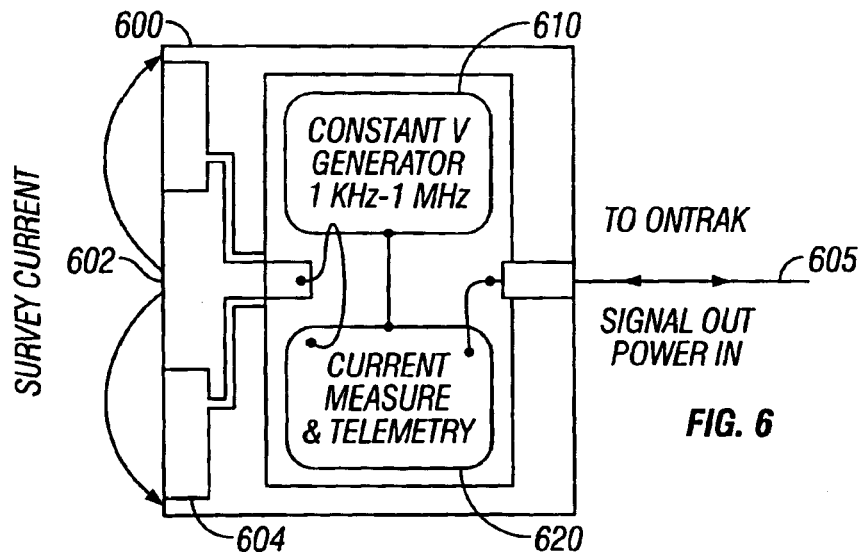
FIG. 6
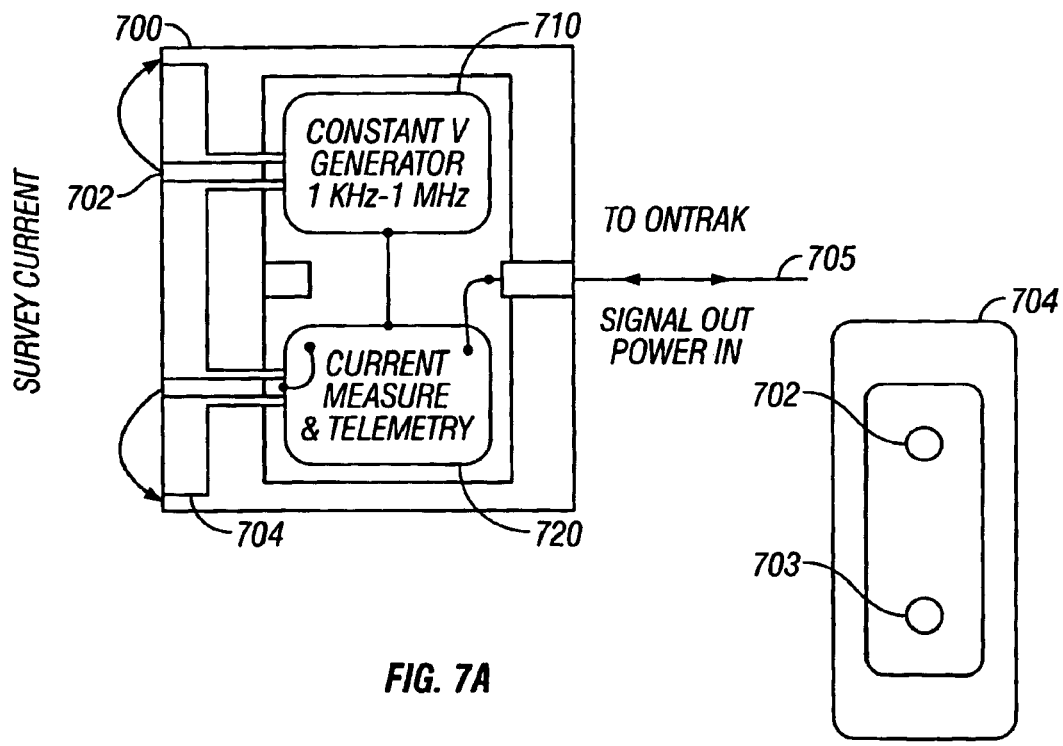
FIG. 7A
FIG. 7B

FORMATION RESISTIVITY MEASUREMENT SENSOR CONTAINED ONBOARD A DRILL BIT (RESISTIVITY IN BIT)

CROSS REFERENCES TO RELATED APPLICATIONS

This application is a continuation-in-part of U.S. patent application Ser. No. 10/090,374, filed on Mar. 4, 2002, now U.S. Pat. No. 6,600,321 which is a continuation-in-part of U.S. patent application Ser. No. 09/836,980 filed on Apr. 18, 2001, now U.S. Pat. No. 6,714,014.

BACKGROUND OF THE INVENTION

1. Field of the Invention

This invention generally relates to exploration for hydrocarbons involving electrical investigations of a borehole penetrating an earth formation. More specifically, this invention relates an instrumented bit on a tool moving along the borehole within an earth formation for introducing and measuring individual survey currents injected into the wall of the borehole. Additional measurement sensors may also be provided.

2. Background of the Art

Electrical earth borehole logging is well known and various devices and various techniques have been described for this purpose. Broadly speaking, there are two categories of devices used in electrical logging devices. In the first category, called "Galvanic" devices, electrodes emit current into the earth formations and voltages are measured to give a resistivity measurement. One of the simplest forms of galvanic devices is the so-called "normal" device where a current electrodes emits a current through the earth formation to a remote return location, and a voltage electrode measures the potential due to that current with respect to the remote reference location. In the second category, inductive measuring tools, an antenna within the measuring instrument induces a current flow within the earth formation. The magnitude of the induced current is detected using either the same antenna or a separate receiver antenna. The present invention belongs to the first category.

Normal type devices have been used extensively in the logging industry to determine formations resistivity when the borehole fluid is either more resistive or is slightly less resistive than the formation. One of the earlier devices was that of Doll wherein a so-called "micronormal" tool was used for measuring resistivity near the borehole wall.

Some Galvanic devices are designed to focus the survey current into the formation whose resistivity is to be determined. For example, Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Other Galvanic devices focus the current near the borehole wall. This is useful when the mud resistivity is much lower than the formation resistivity.

U.S. Pat. No. 4,468,623, issued to Gianzero, discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies.

The device of Gianzero '623, is primarily designed for highly conductive mud. In oil based muds, (OBM) the currents flowing from the electrodes depend upon good contact between the electrode and the borehole wall. If the borehole wall is irregular, the contact and the current from the electrodes is irregular, resulting in inaccurate imaging of the borehole. Finally, being a wireline tool, a plurality of contact pads disposed around the logging tool must be used to get a 360° scan of the borehole.

OBM increase drilling efficiency due to better lubrication of drill bits. In addition, OBM must be used when drilling through water soluble formations. An increasing number of present day exploration prospects lie beneath salt layers U.S. Pat. No. 3,973,181 to Calvert teaches a method and apparatus for investigating earth formations traversed by the borehole containing an electrically nonconductive fluid in which a system of pad-mounted electrodes are arranged laterally around a well tool. A high frequency oscillator is coupled to the electrodes through a selectively variable capacitor. As the apparatus is passed through the borehole, the high frequency current produced by the oscillator capacitively couples the electrodes to the formation and provides a measure of the electrical conductivity or resistivity of the earth formation.

U.S. patent application Ser. No. 09/836,980 of Evans et al. having the same assignee as the present application and the contents of which are fully incorporated herein by reference, teaches an apparatus and method based on the use of high frequency measurements for injecting measure currents into the formation. One embodiment of the device and method taught in the Evans '980 application uses a carrier frequency that is sufficiently high to capacitively couple the measure electrodes to the formation through the nonconducting mud. By modulating the carrier current at a frequency used in prior art resistivity imaging devices, it is possible to get measurements of formation resistivity with relatively minor changes in the hardware of prior art resistivity devices, the main modification being a modulator for producing the measure currents demodulator for demodulation of the measure currents.

U.S. patent application Ser. No. 10/090,374, of Evans, having the same assignee as the present application and the contents of which are fully incorporated herein by reference, discloses a method for obtaining a resistivity image of an earth formation penetrated by the borehole. The apparatus includes at least one measure electrode that injects a measure current into the formation. Due to the high frequency of the current, an electrical circuit is complete when the borehole is filled with a non-conductive fluid through a capacitive gap between the electrode and the formation. A guard potential is provided to maintain focusing of the current. The modulation of the measure current and the demodulation of the output of the current measuring circuit helps reduce the cross-talk between them. Amplitude modulation reverse amplitude modulation, frequency modulation or phase modulation may be used.

Various advantages can be obtained by placing the measuring instruments close to the drill bit. The biggest advantage is to being able to know immediately and in real time the resistivity and other properties of the earth formation. This is useful in, for example, knowing the casing point the coring point. U.S. Pat. No. 5,448,227, issued to Orbin et al. discusses a measurement-while-drilling system which includes a sensor sub positioned at the lower end of a downhole motor assembly so that the sub is located near the drill bit. The sub houses instrumentalities that measure various downhole parameters such as inclination of the borehole, the natural gamma ray emission of the formations, the electrical resistivity of the formations, and a number of mechanical drilling performance parameters. Although the techniques of this patent make substantial progress in moving sensors closer to the drill bit and overcoming some of the major telemetry concerns, the sensors are still approximately 2–3 m. from the drill bit. In addition, the sensors are still located in the motor assembly and the integration of these sensors into the motor assembly can be a complicated process.

U.S. Pat. No. 6,057,784, issued to Schaaf et al. discusses an apparatus and system for making measurements at the drill bit using sensors in the bit box attached directly to the bit. Sensor measurements are transmitted via wireless telemetry to a receiver located in a conventional MWD tool. In one implementation of the Schaaf the measuring instrumentation is placed in the bit box on the drill bit. In this embodiment, the upper portion of the drill bit is a housing that contains the measuring instruments, the telemetry means and power and control devices. The drill bit housing is connected to the bit box. While moving the sensor measurements closer to the drill bit, there is still a distance between sensor devices and drill in Schaaf. In addition, since the bit box is smaller than the outer diameter of the drill, the standoffs are relatively large. Furthermore, the Schaaf device cannot be used with oil-based mud.

It would be desirable to have an apparatus and method of determination of formation resistivity that is located on or near the drill bit, is relatively insensitive to borehole rugosity and can be used with either water based or with oil-based muds. The present invention satisfies this need.

SUMMARY OF THE INVENTION

The present invention is an apparatus for making measurements of the resistivity of an earth formation during the drilling process. A drill bit is conveyed on a bottom assembly for the purpose of drilling the borehole. At least one measure electrode is carried on an exterior surface of the drillbit and is used to convey a measure current into the formation. A device set in a cavity of the drillbit is responsive to at least one of (i) the current, and, (ii) the voltage of the at least one measure electrode. The response of this device indicates a measurement of resistivity of formation near the borehole. A source of voltage coupled to the at least one electrode provides a specified voltage to the at least one electrode.

In a preferred embodiment, the at least one electrode comprises a first electrode and a second electrode. The apparatus further comprises a source of current for producing a measure current in the first electrode, and a measuring device for measuring the measure current and a voltage in the second electrode. In a borehole which includes a substantially nonconducting fluid, the measure current may have a carrier frequency selected to capacitively couple the measure electrode to the earth formation. A processor can be used to determine one of a maximum or a minimum value of the signal.

A method of obtaining a resistivity measurement is used by which a drill bit is conveyed on a bottom hole assembly into a borehole. A measure current is injected into the borehole and into the surrounding formation. An electrically responsive device obtains a measured signal which indicates a resistivity value. Current injection occurs through at least one measure electrode. At least one measure electrode can be a first electrode and a second electrode, wherein the first electrode produces a measure current, and the second electrode measures a measure current and a voltage in the second electrode. In a substantially non-conducting fluid, the measure current operates at a carrier frequency that is selected to capacitively couple the measure electrode to the earth formation. Measurements can be taken and processed to determine either a maximum value of the signal or a minimum value.

BRIEF DESCRIPTION OF THE FIGURES

The invention is best understood with reference to the following figures in which like numerals refer to like elements.

FIG. 6 shows an instrumented bit with a mono-electrode for measuring a resistivity parameter.

FIGS. 7A, 7B illustrate an instrumented bit with a dual electrode for measuring a resistivity parameter.

DETAILED DESCRIPTION OF THE INVENTION

Figure 1:
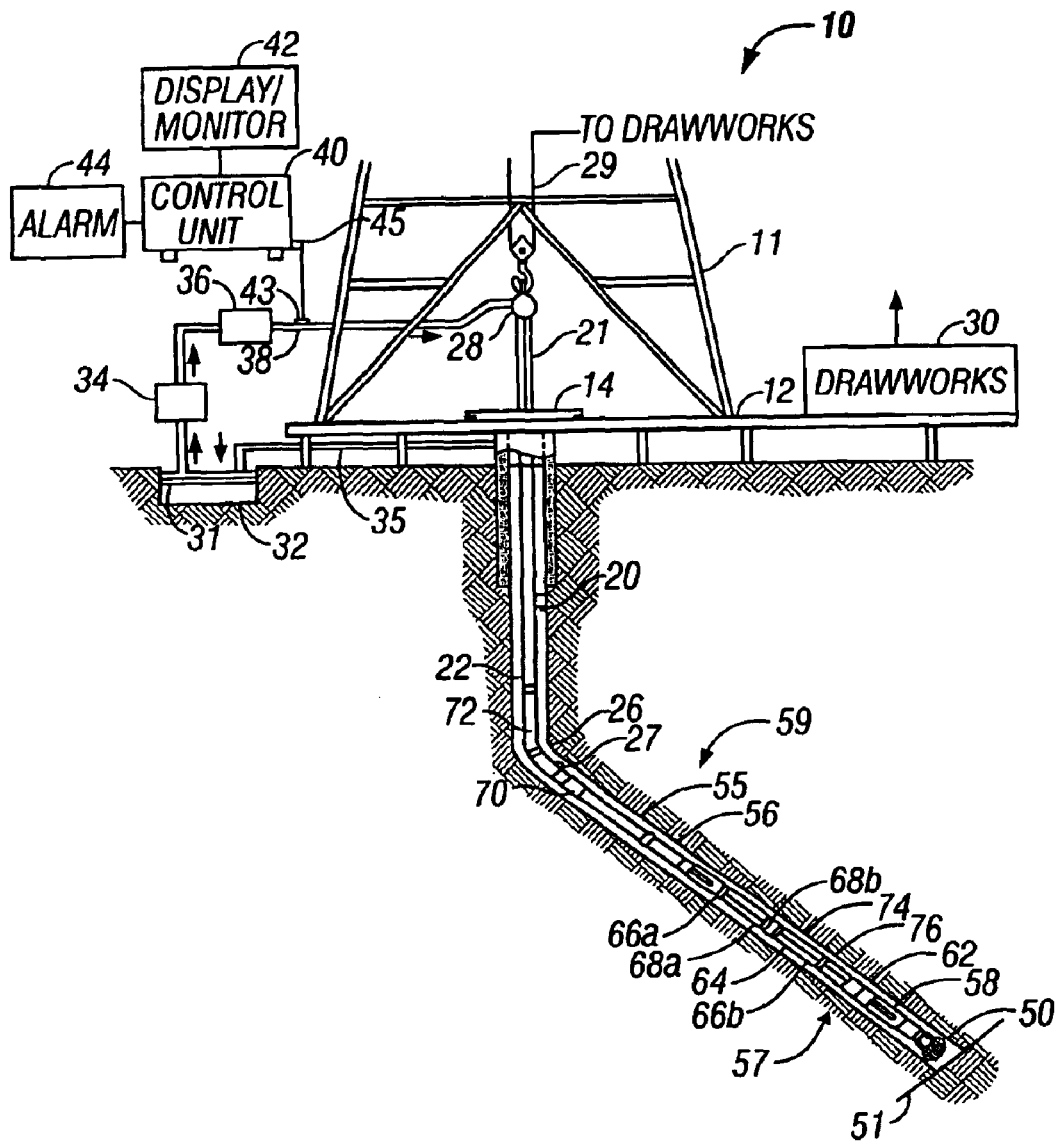
FIG. 1 (Prior art) is a schematic illustration of a drilling system.

FIG. 1 shows a schematic diagram of a drilling system 10 having a downhole assembly containing a sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In a preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is preferably placed in a housing 70 above the mud motor 55 and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In a preferred embodiment, the sensor assembly includes a resistivity device, gamma ray device, and inclinometer.

The downhole assembly of the present invention preferably includes a MWD section 78 which contains a nuclear formation porosity measuring device, a nuclear density device and an acoustic sensor system placed above the mud motor 64 in the housing 78 for providing information useful for evaluating and testing subsurface formations along borehole 26. The present invention may utilize any of the known formation density devices. Any prior art density device using a gamma ray source may be used. In use, gamma rays emitted from the source enter the formation where they interact with the formation and attenuate. The attenuation of the gamma rays is measured by a suitable detector from which density of the formation is determined.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such as electromagnetic and acoustic techniques or any other suitable technique may be utilized for the purposes of this invention. The drilling assembly also includes a directional sensor. Without limiting the scope of the invention, the directional sensor can be a magnetometer or of the inertial type.

Figure 2:
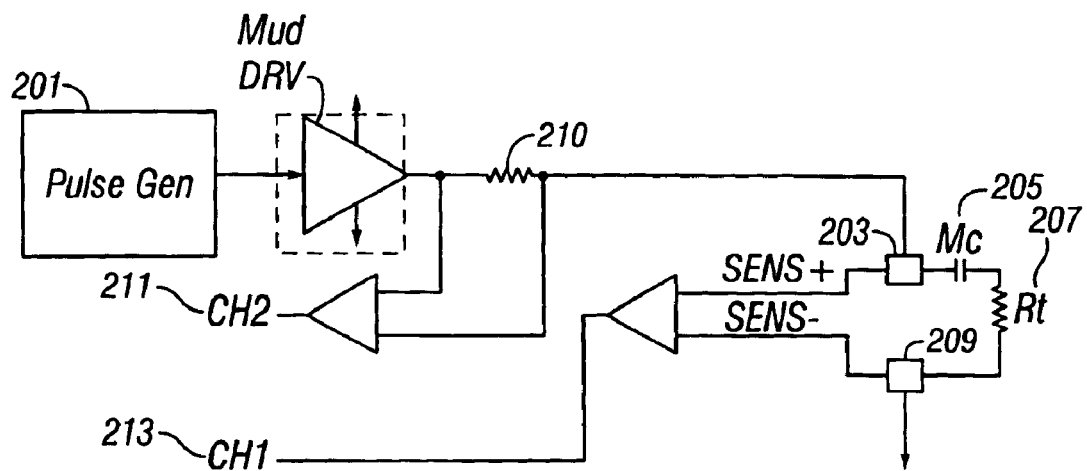
FIG. 2 (Prior art) is a circuit diagram representing a formation resistivity device according to the present invention.

FIG. 2 is a circuit diagram illustrating the methodology of formation resistivity measuring devices. A current electrode depicted by 203 injects a measure current into a formation denoted by 207 having a resistivity $R_t$. This current is supplied by a source of current 201. The current from the formation returns (not shown) through a return electrode (ground) denoted by 209. Typically, a voltage drop 211 across a resistor 210 in the circuit is used as an indication of the measure current. By measuring the voltage drop 213 between the measure electrode and the return electrode, information is derived about the impedance encountered by the current between the measure electrode 203 and the ground 209.

Figure 3:
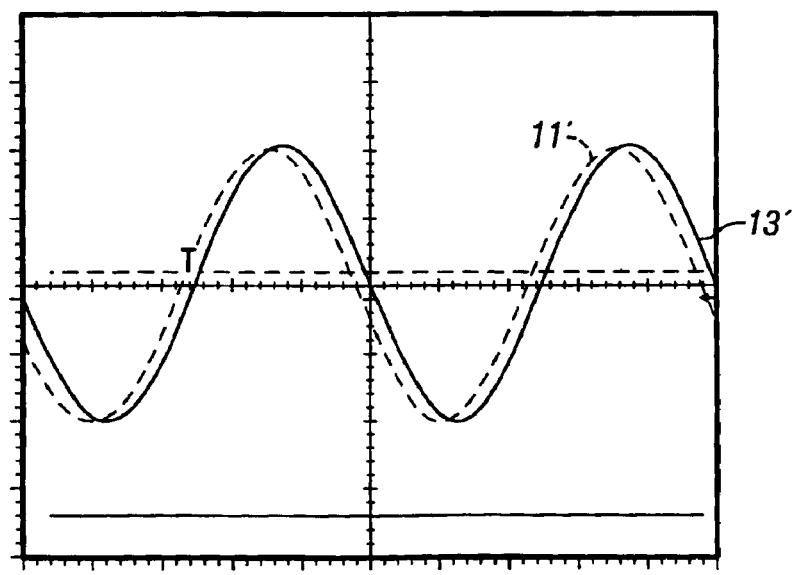
FIG. 3 (prior art) shows a comparison of signals representative of the measure current and the voltage for the circuit of FIG. 2 for a 1 kHz sinusoidal excitation signal.

This impedance, as noted above, includes the desired formation resistivity $R_t$. In addition, there is also an impedance 205 between the measure electrode 203 and the formation 207. In water based (conductive) muds (WBM), this impedance is almost entirely resistive and is caused by the mud cake and any invasion of the borehole fluid into the formation. However, in oil-based (non conductive) muds, the impedance between the measure electrode 203 and the formation 207 is primarily capacitive, denoted by a capacitance $M_c$. This capacitance manifests itself in a phase shift between the measure current signal and the voltage drop from the measure electrode to ground. This is seen in FIG. 3 which shows a phase shift between the signals 11' and 13' for a sinusoidal current of 1 kHz. This frequency is typical of prior art formation resistivity measurement devices. The curves in FIG. 3 are normalized independently to emphasize the phase shift: in reality, there could be differences of several orders of magnitude between the two signals.

Figure 4:
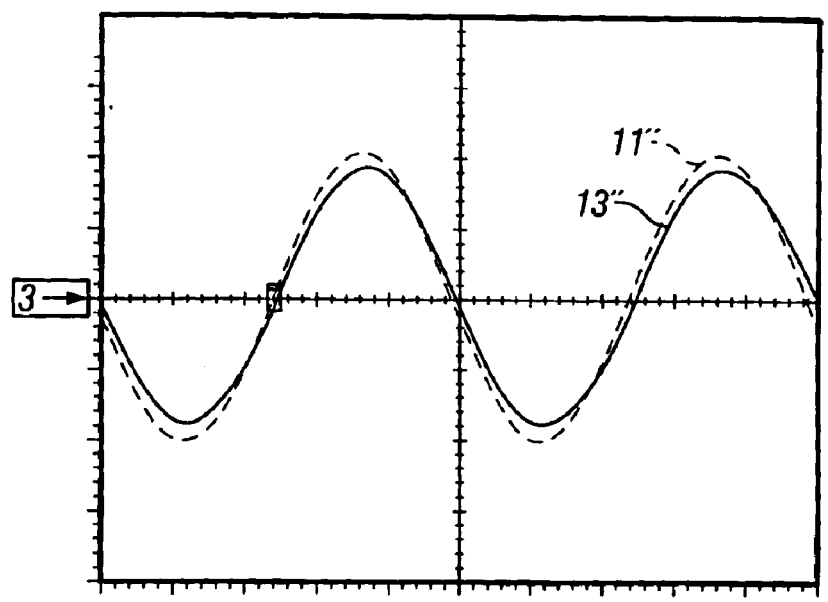
FIG. 4 (prior art) shows a comparison of signals representative of the measure current and the voltage for the circuit of FIG. 2 for a 10 kHz sinusoidal excitation signal.
Figure 5:
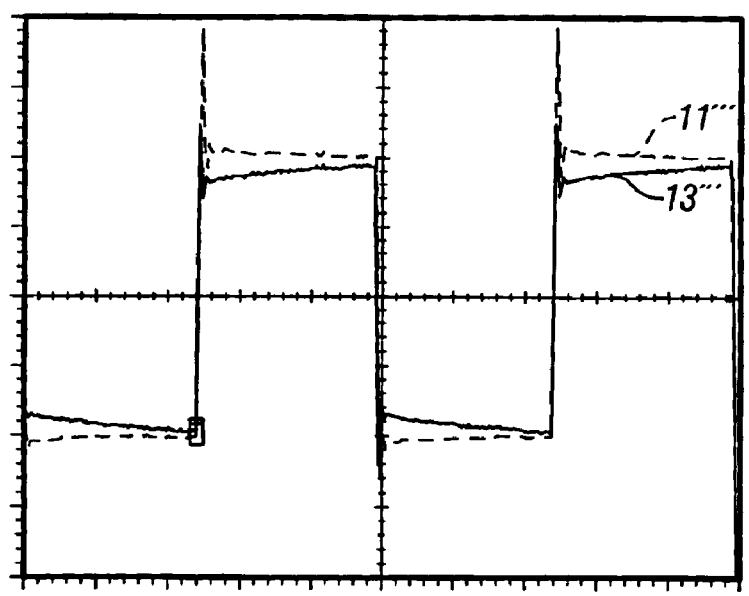
FIG. 5 (prior art) shows a comparison of signals representative of the measure current and the voltage for the circuit of FIG. 2 for a 10 kHz square wave excitation.

Turning now to FIG. 4, the signals 11" and 13" for a sinusoidal current of 10 kHz are shown. The phase shift between the two signals is seen to be much smaller. This is due to the fact that at the higher frequency of 10 kHz, the effect of the capacitance is less than at 1 kHz. This suggests that by using higher frequencies, it would be possible to get signals indicative of the formation resistivity. This is confirmed in FIG. 5 which shows the signals 11''' and 13''' for a square wave excitation at 10 kHz. As can be seen, both the signals rise and fall almost instantaneously: this is due to the fact that a square wave contains a lot of high frequencies that are essentially unimpeded by the capacitance of the mud.

Figure 8A:
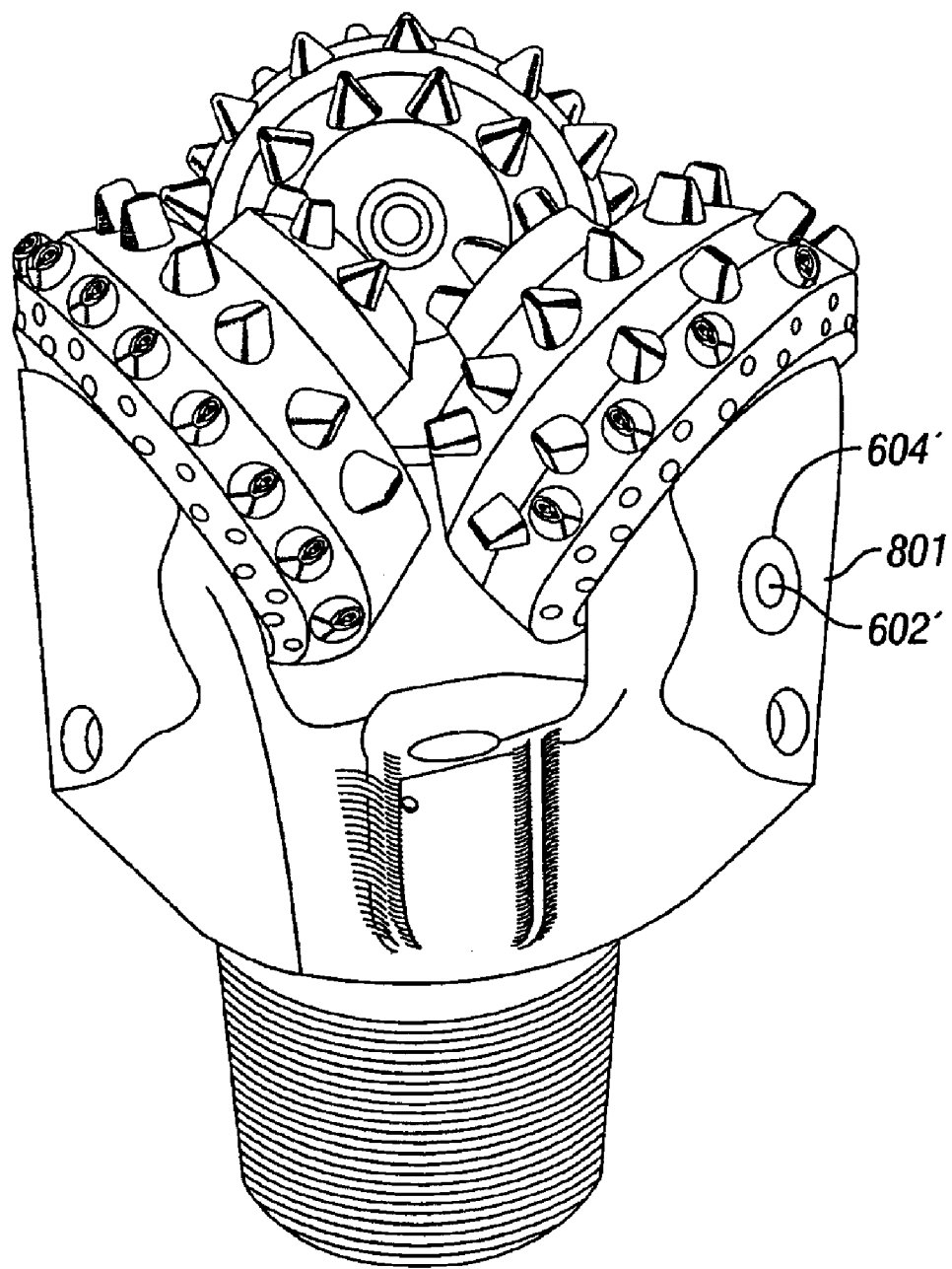
FIGS. 8A, 8B show drill bit assemblies suitable for use with the present invention.
Figure 8B:
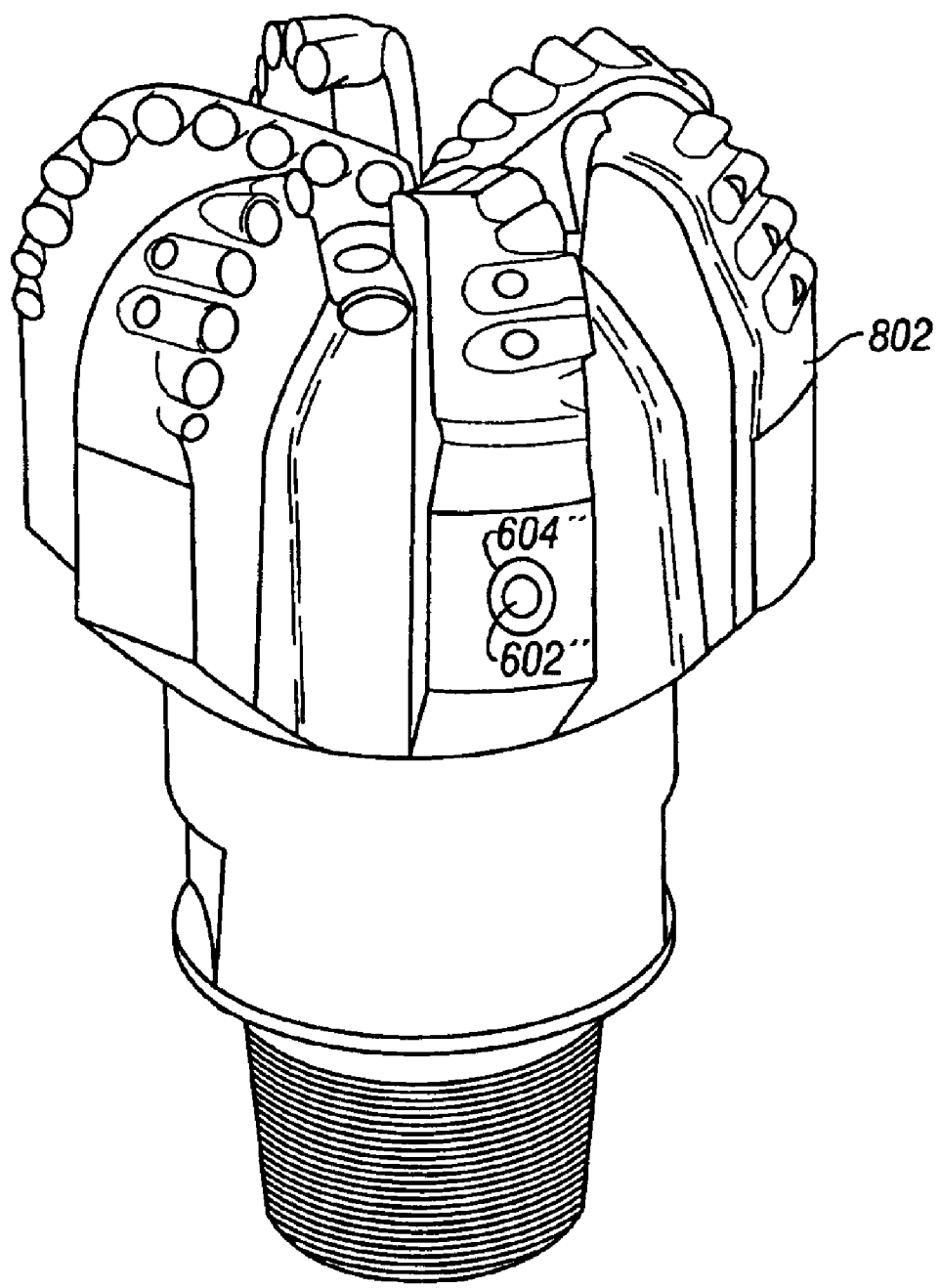

FIGS. 8A and 8B show drill bit assemblies that are suitable for use with the present invention. FIG. 8A shows an AirXL® drill bit design of Baker Hughes, Incorporated of Houston Tex., which is specifically designed for air drilling applications. A measurement system of a preferred embodiment of the invention can be located within one or more drill bit arms 801. The electrode system is located at the outer face of the arm 801 directed towards the borehole wall. Annular insulation 604' isolates the electrode 602' electrically from the surrounding machinery.

FIG. 8B shows an alternate drill bit assembly, a Genesis® drill bit design also of Baker Hughes, Incorporated of Houston Tex., which is suitable for use with the present invention. A measurement system can be located in blade 802 on a face directed towards the borehole wall. The electrode system can be similarly disposed along the edge of the blade 802 facing the borehole wall. Annular insulation 604" isolates the electrode 602" electrically from the surrounding machinery.

FIG. 6 shows a cross-section of a preferred embodiment of the present invention. An instrumented bit is used in a mono-electrode system. Electrode 602 is recessed into a cavity in a blade 600 of the instrumented drill bit so that the outer edges are flush with the edge of the blade. The electrode 602 is electrically isolated from the blade 600 by insulation 604. The blade further comprises a current measurement and telemetry device 620 as well as a constant voltage generator 610. The current measurement device 620 is connected by electrical leads to electrode 602 and to the constant voltage generator 610. Power is provided through an electrical power line 605 connected to the current measurement device 620. The measured signal is sent from the blade along wire 605. The constant voltage generator 610 produces a constant voltage oscillating preferably in a frequency range of 1 kHz to 1 MHz.

Selection of the size of the measure electrode and the operating frequency is based upon several considerations. One important consideration is that the impedance of the formation must be substantially resistive at the operating frequency so that the currents in the measure electrode are indicative of the formation resistivity and substantially unaffected by its dielectric constant. Based upon typical values of formation dielectric constant such as that disclosed in U.S. Pat. No. 5,811,973 issued to Meyer et al., the operating frequency should be less than 4 MHz. A preferred embodiment of the present invention uses a measuring current at a frequency of 1 MHz. A second consideration is that the impedance (i.e., resistance) of the formation be greater than the impedance of the rest of the circuit. Another consideration is the desired resolution of the tool.

The impedance of the equivalent capacitance and the body of the tool may be ignored at 1 MHz since the equivalent capacitor has an enormous area comparable to the size of the tool. The capacitance of the borehole fluid 205 is a function of the dielectric constant of the borehole fluid, the area of the electrode, and the stand-off between the electrode and the borehole wall. Formation resistivities encountered in practice may range between 0.2 Ω-m and 20,000 Ω-m.

In one mode of operation, a survey current is injected from electrode 602 into the surrounding material. Current measurements are sent out along line 605, which also serves to supply power. Generally, as the drill bit rotates, the electrode 602, rotating with the drill bit, passes through a point of contact or a point of closest approach with the borehole wall. In WBM, the current flow generally reach a minimum at or near this point. This is due to the fact that the quantity of conductive mud between the electrode and the more resistive formation is much reduced. Alternatively, in oil-based muds, a maximum current flow generally corresponds to a point of closest approach to the borehole wall. This is due to the fact that there is better coupling with the less resistive formation through a thinner layer of resistive mud. Hence In an optional embodiment of the invention, the current readings can be sorted into a number of disjoint azimuthal bins along the circumference of the drilling tool. A series of resistivity measurements can be made within each azimuthal bin, and a method can be used to determine the resistivity value at that azimuthal location. For instance, in the case of WBM, a resistivity measurement that is used for a bin corresponds to minimum current flow is used within the bin. In OBM, the resistivity value used for a bin corresponds to maximum current flow is used.

A preferred embodiment of the invention is shown in FIG. 7a, which show two electrodes, 702 and 703, in a dual-electrode/micronormal system. The electrodes and electronics are disposed within the cavity of the blades. Insulation 704 isolates electrodes 702 and 703 electrically from the blade. FIG. 7b shows a view of the face of the electrode, wherein insulation 704 isolates electrodes 702 and 703 from the blade. Referring back to FIG. 7a, the embodiment shown is much less sensitive to stand-off than the embodiment of FIG. 6. The blade further comprises a current/voltage measurement and telemetry device 720. A survey current is established at electrode 702 and a survey voltage is measured at electrode 703. Current and voltage are measured via the device 720 which sends out the signal along line 705. Resistivity is obtained by taking a ratio of voltage to current with a suitable geometric calibration factor. As noted above, in WBM, a resistivity value corresponding to a maximum resistivity measurement flow is used. . . while in OBM, a resistivity value corresponding to minimum resistivity measurement is used. Typical spacing between electrodes is approximately ½ inch, with insulation surrounding the electrodes covering an area approximately 2" by 3".

Exemplary drill bits for use with the invention are shown in FIGS. 8a and 8b. It can be seen that with a drill bit such as that in FIG. 8a, there would be a standoff between the electrode 602' and the borehole wall that is defined by the outermost extent of the drill bit 805. Such a drill bit could be used with WBM. In contrast, with a drill bit such as that shown in FIG. 8b, the electrode would be substantially flush with the borehole wall. Such a drill bit could be used with either WBM or with OBM. Thus, one of the features of the present invention is selecting a drill bit with a profile that provides a suitable minimum standoff based on the type of drilling mud being used.

When orientation sensors are used for determining the orientation of the drill bit, this orientation information may be combined with resistivity information obtained from the current and voltage measurements to get an estimate of azimuthal variation of resistivity of the earth formation. A common cause of azimuthal resistivity variation is the presence of fine layers or different resistivity in the earth formation. When these are inclined to the borehole, an azimuthal variation in resistivity (typically as a sinusoidal variation) as measured by the device of the present invention will result. This sinusoidal variation can be detected using known processing methods out of the noisy "signal" Suitable orientation sensors may be located on the drill string near the drill bit, or on the shaft of a drilling motor if one is used. Such orientation sensors should be placed close enough to the drill bit so that the orientation measurements are indicative of the dill bit orientation and not affected by twisting of the drill string or motor shaft.

In addition to resistivity sensors, other sensors could also be included in a cavity on the drill bit for measurement of downhole parameters. U.S. Pat. No. 5,813,480 to Zaleski at al, having the same assignee as the present invention and the contents of which are fully incorporated herein be reference, teach a temperature measuring and recording system in a cavity on a drill bit. The teachings of the Zaleski patent are directed primarily towards the monitoring an operating condition of the drill bit and taking corrective action when failure of the drill bit may be imminent. A temperature sensing device such as that taught by Zaleski may be included as part of the present device. A particularly useful feature of such a temperature sensing device is as an early "kick" indicator. Such kick indicators are useful during drilling operations for providing early warning of a severe change in formation pressure ahead of the drill bit. As would be known to those versed in the art, the fluid pressure in a borehole is commonly maintained at a pressure close to that of the formation. Drilling into an overpressured formation can lead to a catastrophic blowout. With respect to the present invention, a sudden drop in temperature would be associated with a sudden influx of gas into the borehole near the top of an overpressured formation. On the other hand, a slight but sudden increase in temperature is associated with an influx of a liquid into the borehole. Having such early kick indicators is useful in taking corrective action (such as by increasing the mud weight) prior to drilling into an overpressured formation.

A pressure sensor in the drillbit can also be used as an early kick indicator. However, such pressure measurements would have to be corrected to eliminate pressure variations from other known causes, such as those produced in the drilling fluid as part of mud pulse telemetry. Early kick indicators from either temperature or pressure variations can give warnings of potential drilling problems much earlier than would be available with formation pressure testers such as are disclosed in U.S. Pat. No. 6,427,530 to Krueger et al, having the same assignee as the present application.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for making measurements of a parameter of interest of an earth formation during the drilling of a borehole therein, the apparatus comprising:
   (a) a drill bit conveyed on a bottom hole assembly for drilling the borehole;
   (b) a first electrode carried on an exterior surface of the drillbit for conveying a measure current into the formation; and
   (c) a measuring device set in a cavity on the drillbit responsive to (i) the measure current in the first electrode, and, (ii) a voltage of a second electrode with respect to a remote reference.

2. The apparatus of claim 1 further comprising a source of current coupled to the at least one electrode, said source of current located within said cavity on the drillbit.

3. The apparatus of claim 1 wherein the drillbit has a profile for providing a standoff from a borehole wall based at least in part on a fluid type in said borehole.

4. The apparatus of claim 1 wherein said borehole includes a substantially nonconducting fluid, and wherein said measure current has a frequency selected to capacitively couple said measure electrode to said earth formation.

5. The apparatus of claim 1 further comprising a processor for determining said signal based on one of (i) a maximum value of said current, and, (ii) a minimum value of said current.

6. The apparatus of claim 1 further comprising at least one additional sensor on said drillbit for providing a measurement of an additional parameter of interest of the earth formation, said at least one additional sensor selected from the group consisting of (i) a temperature sensor, and, (ii) a pressure sensor.

7. A method determining a resistivity of an earth formation during the drilling of a borehole, the method comprising:
   (a) conveying a drill bit on a bottom hole assembly into a borehole;
   (b) using a first electrode on an outer surface of said drill bit to inject a measure current into the formation;

(c) measuring a voltage of a second electrode on said drill bit; and (d) determining said resistivity from a value of said measure current and said measured voltage of said second electrode.

8. The method of claim 7 further comprising selecting said drillbit to provide a standoff from a wall of the borehole based on a type of fluid in said borehole.

9. The method of claim 7 wherein determining said resistivity further comprises using a value of the measure current selected from the group consisting of (i) a minimum value of said measure current, and, (ii) a maximum value of said measure current during rotation of said drill bit.

10. The method of claim 7, wherein said borehole includes a substantially non-conducting fluid, and wherein said measure current has a frequency selected to capacitively couple said measure electrode to said earthy formation.

11. The method of claim 7 further comprising obtaining an additional measurement by using an additional sensor selected from the group consisting of(i) a temperature sensor, and, (ii) a pressure sensor on the drill bit, as an early kick indicator.

12. The method of claim 11 further comprising using said additional measurement as a kick indicator.

\* \* \* \* \*